United States Patent
Yamamoto et al.

(10) Patent No.: US 7,289,563 B2
(45) Date of Patent: Oct. 30, 2007

(54) SECURITY CAMERA SYSTEM

(75) Inventors: Naoki Yamamoto, Yokohama (JP);
Taku Nakamura, Yokohama (JP);
Takuya Imaide, Fujisawa (JP);
Hiroyasu Ohtsubo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 852 days.

(21) Appl. No.: 10/607,062

(22) Filed: Jun. 27, 2003

(65) Prior Publication Data

US 2004/0145657 A1 Jul. 29, 2004

(30) Foreign Application Priority Data

Jun. 27, 2002 (JP) ............................. 2002-187043

(51) Int. Cl.
*H04B 1/66* (2006.01)
*H04N 7/12* (2006.01)
*H04N 11/02* (2006.01)
*H04N 11/04* (2006.01)

(52) U.S. Cl. .................. 375/240.12; 348/143; 348/159

(58) Field of Classification Search ...................... None
See application file for complete search history.

(56) References Cited

U.S. PATENT DOCUMENTS 6,091,777 A * 7/2000 Guetz et al. ........... 375/240.11
6,560,581 B1 * 5/2003 Fox et al. ..................... 705/51
2003/0094489 A1 * 5/2003 Wald .......................... 235/386
2003/0174775 A1 * 9/2003 Nagaya et al. ......... 375/240.12
2005/0146621 A1 * 7/2005 Tanaka et al. ........... 348/211.2

FOREIGN PATENT DOCUMENTS

JP   A-2001-186507   * 12/1999

* cited by examiner

*Primary Examiner*—Nhon Diep
(74) *Attorney, Agent, or Firm*—Antonelli, Terry, Stout & Kraus, LLP.

(57) ABSTRACT

A security camera system having one or more monitoring cameras, each of which transmits a digital video signal after compressing/encoding, are connected to a controller via a network. In the controller, a media control section stores the video signal supplied from the monitoring cameras in a storage medium and reads out the video signal as needed. Image processing for privacy protection is carried out to the real-time video signal supplied from the monitoring camera and the video signal read out from the storage medium. The level of the image processing for privacy protection is switched depending on the authority of a user who views the video image. Further, even for the same user authority, the image processing level for privacy protection is switched and adjusted depending on the size of the object in the video image.

8 Claims, 6 Drawing Sheets

501

502

503

504

505

SECURITY CAMERA SYSTEM

BACKGROUND OF THE INVENTION

The present invention relates to a security camera system or video monitoring system, and in particular, to a security camera system capable of improving both security and privacy protection.

Video monitoring systems (security camera system) taking the right of portrait, privacy protection, etc. into consideration have been proposed, as disclosed in JP-A-2001-186507 for example. The system described in the document comprises: a building video information delivery module which delivers video information collected inside or around a building to a video display terminal which is placed inside or nearby the building; a portrait right protection module which carries out a concealing process to part of the video information that is relevant to the right of portrait or privacy; and an administration right confirmation module which confirms whether the viewer of the video display terminal has proper right or authority to view unconcealed video information (to which the concealing process has not been done) or not and delivers the unconcealed video information to the video display terminal when the viewer's administration right is confirmed.

SUMMARY OF THE INVENTION

However, the system described in the above document, delivering real-time video information only, is not capable of ensuring enough security. Functions for allowing the administrator etc. to monitor afterward or identify a suspicious individual after an incident (crime etc.) took place are necessary.

Further, it is expected that the viewer of the monitor video images changes depending on the situation. For example, the viewer can change from a janitor (at ordinary times) to security guards dispatched by a security company (when there is something suspicious), and to police officers etc. (when a crime took place). Meanwhile, from the standpoint of monitored individuals, it is unpleasant to be watched constantly even under normal circumstances where there is nothing suspicious, and it is undesirable from the viewpoint of privacy protection. Therefore, a function for changing the level of privacy protection depending on the viewer and the situation becomes necessary.

It is therefore the object of the present invention to provide a security camera system or monitoring system capable of resolving the above problems and realizing both the security and the privacy protection.

In order to attain the above objects, the security camera system of the present invention has the following features.

One or more monitoring cameras, each of which transmits a digital video signal after compressing/encoding, are connected to a controller via a network. In the controller, a media control section stores the video signal supplied from the monitoring cameras in a storage medium and reads out the video signal as needed. Image processing for privacy protection is carried out to the real-time video signal supplied from the monitoring camera and the video signal read out from the storage medium.

The level of the image processing for privacy protection is switched depending on the authority of a user who views the video image.

Further, even for the same user authority, the image processing level for privacy protection is switched and adjusted depending on the size of the object in the video image.

BRIEF DESCRIPTION OF THE DRAWINGS

These and other features, objects and advantages of the present invention will become more apparent from the following description when taken in conjunction with the accompanying drawings, wherein.

DESCRIPTION OF THE EMBODIMENTS

Figure 1:
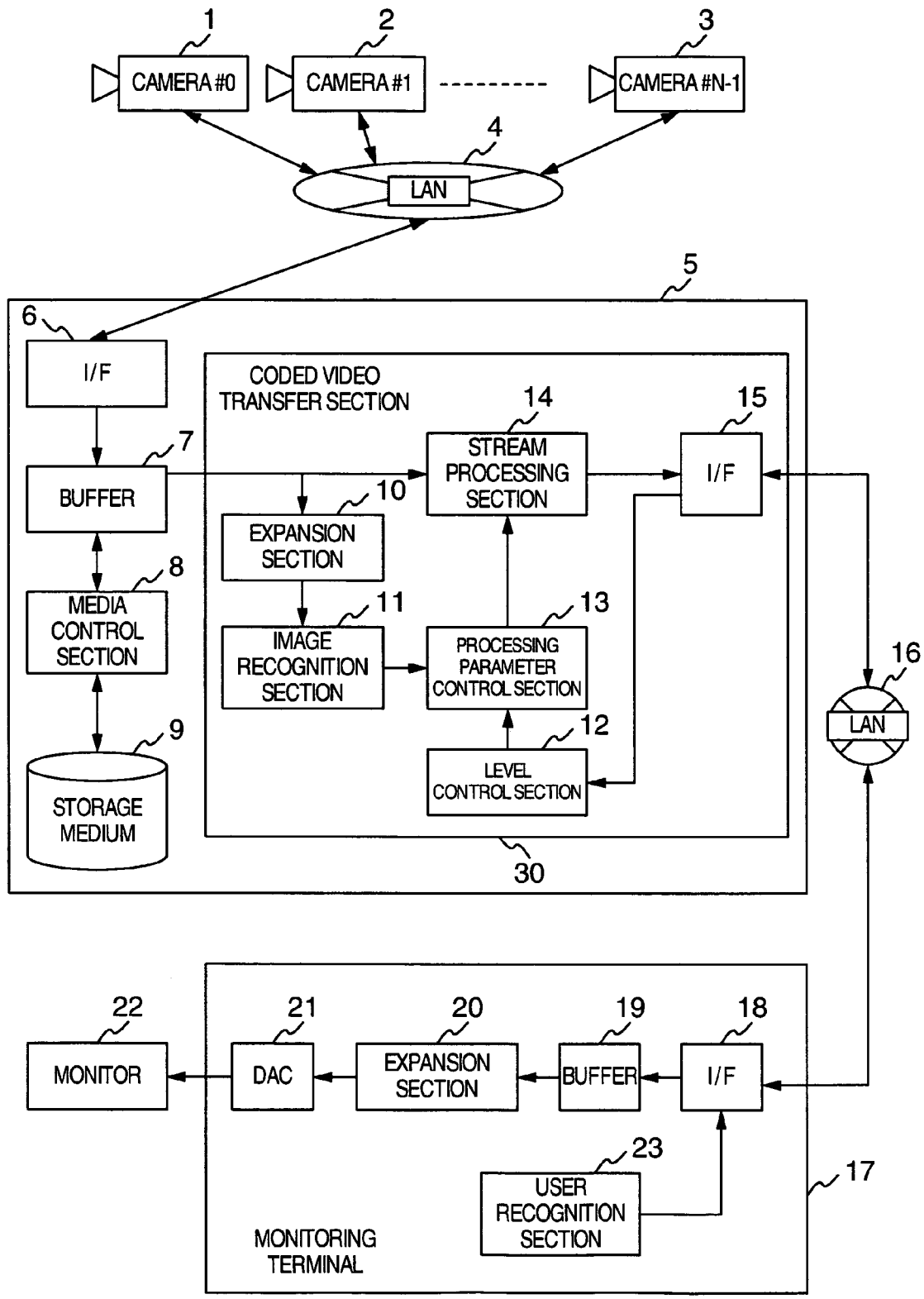
FIG. 1 is a block diagram showing the composition of a digital monitoring system as a security camera system in accordance with the first embodiment of the present invention.

Referring now to the drawings, a description will be given in detail of preferred embodiments in accordance with the present invention.

First, a security camera system (video monitoring system) in accordance with a first embodiment of the present invention will be described with reference to FIGS. 1 through 5.

The following description of the embodiments will be given assuming the use of encoding/decoding (compression/decompression) techniques employing DCT (Discrete Cosine Transform), such as the standards ISO/IEC13818-2 (MPEG2) and ISO/IEC10918-1 (JPEG).

FIG. 1 is a block diagram showing the composition of a digital monitoring system as a security camera system in accordance with the first embodiment of the present invention. In FIG. 1, the reference numerals "1" through "3" denote monitoring cameras or surveillance cameras, "4" and "16" denote LANs (Local Area Networks), "5" denotes a controller, "17" denotes a monitoring terminal, and "22" denotes a monitor to be watched for monitoring. The same reference numerals will also be used in the following figures for the same or equivalent elements.

Each monitoring camera 1-3 connected to the LAN 4 obtains video images from their positions, carries out digital encoding to the video images, and transmits the digital information to the controller 5 via the LAN 4.

Figure 2:
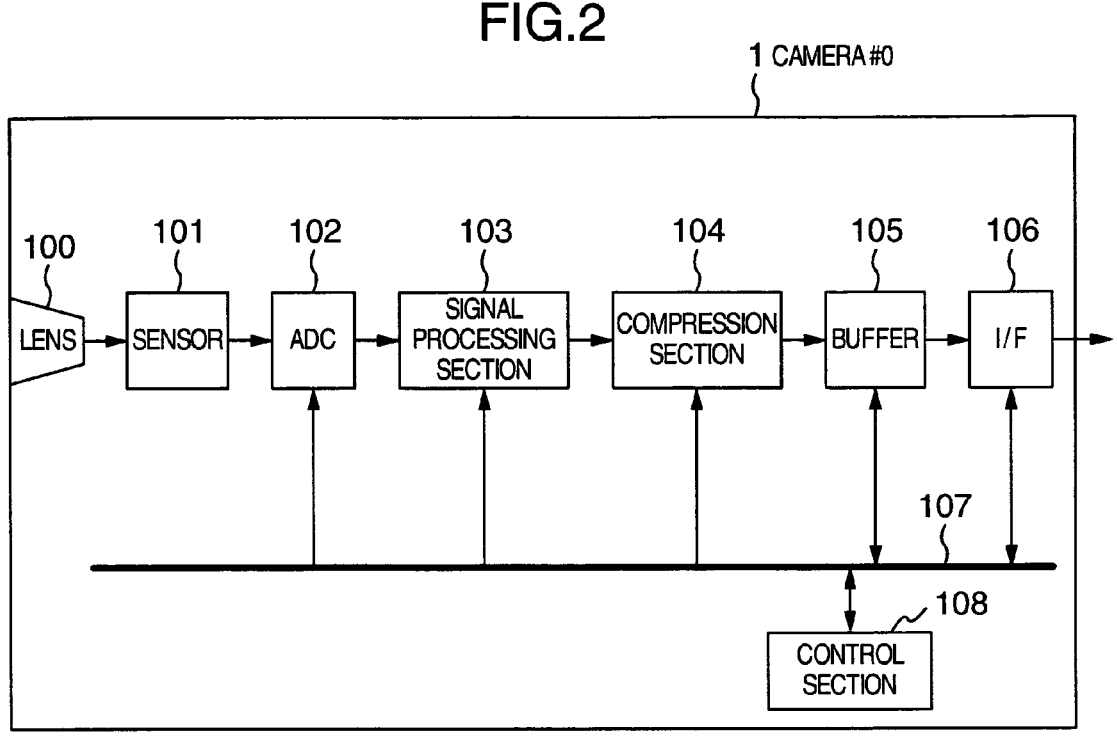
FIG. 2 is a block diagram showing the detailed composition of a monitoring camera section of the security camera system of FIG. 1.

FIG. 2 is a block diagram showing the detailed composition of the camera section 1. An image formed through a lens section 100 is received by sensors 101 (photoelectric conversion elements such as CCDs) and converted into an image signal. The image signal is converted by an ADC (Analog-to-Digital Converter) 102 into a digital signal, and the digital signal is supplied to a signal processing section 103. The signal processing section 103 generates a video signal which is composed of a brightness signal and color-difference signals by means of conventional signal processing techniques (color separation, gamma correction, etc.) and inputs the video signal to a compression section 104. The compression section 104 compresses the video signal by a compression process employing DCT (MPEG2, JPEG, etc.) and thereby generates a coded video signal. The coded video signal is buffered in a buffer 105, transmitted by an interface (I/F) 106, and transferred to the controller 5 via the LAN 4. The other cameras 2 and 3 also operate similarly.

As above, digital encoding (compression) is conducted by the monitoring cameras 1-3 for transmitting the video signals, by which the amount of data transferred through the LAN (traffic) can be reduced.

The controller 5 show in FIG. 1 carries out: reception of the coded video signal supplied via the LAN 4; operation control of the cameras 1-3, R/W control of a storage medium 9; stream processing control of the coded video signal; and transfer control of the processed coded video signal.

An I/F section 6 of the controller 5 receives the coded video signal transferred via the LAN 4 and temporarily stores the signal in a buffer 7. The coded video signal stored in the buffer 7 is read out by a coded video transfer section 30 in order to prepare and output a (processed) coded video signal for monitoring. Meanwhile, when the coded video signal in the buffer 7 is transferred to the storage medium 9, the signal is read out by a media control section 8.

When the video images are played back, the coded video signal stored in the storage medium 9 is read out by the media control section 8, temporarily stored in the buffer 7, and read out from the buffer 7 by the coded video transfer section 30 to be transmitted to the monitoring terminal 17.

In the following, the operation of the coded video transfer section 30 will be explained in detail.

The coded video signal supplied to the coded video transfer section 30 is inputted to an expansion section 10, by which the coded video signal is expanded and restored to the original video signal. The expanded video signal is inputted to an image recognition section 11, by which the figure and face of the object of shooting is recognized and thereby figure recognition blocks containing the figure or face of the object are determined. The recognition process can be implemented by techniques disclosed in JP-A-7-7666 and JP-A-9-134418, for example. The figure recognition block means a block (that is obtained by partitioning a frame into a plurality of blocks) that contains (part or all of) the figure/face of the object. For example, the figure recognition block can be a pixel block of 8*8 pixels containing the figure/face of the object, such as the MCU (Minimum Coded Unit) of JPEG and the macro block of MPEG.

Information concerning the figure recognition blocks are inputted to a processing parameter control section 13. The processing parameter control section 13 also receives processing level information which is supplied from a level control section 12. The level control section 12 receives user information supplied from a user recognition section 23 of the monitoring terminal 17 via the LAN 16, judges and determines the level of the user viewing the video images on the monitor 22, and sends the processing level information to the processing parameter control section 13.

The user recognition section 23 of the monitoring terminal 17 performs authentication of the monitoring user based on information (password, voice print, fingerprint, iris image, etc.) obtained through an input device (unshown keyboard, microphone, fingerprint reader, camera, etc.). The user recognition section 23, having a table associating each user ID with authentication conditions (the password, etc.) corresponding to the user ID, carries out the user authentication by referring to the table. When the user is authenticated, the user recognition section 23 sends information (user ID, for example) specifying the user or concerning the user to the level control section 12 as the aforementioned user information. The level control section 12, having a table associating the user information with the processing level information, obtains the processing level information from the user information by referring to the table, and sends the processing level information to the processing parameter control section 13.

By use of the processing level information, the processing parameter control section 13 determines processing parameters (specifying how each block on the stream of the coded video signal should be processed) and inputs the processing parameters to a stream processing section 14. The stream processing section 14 processes and edits the coded video signal supplied from the buffer 7 according to the processing parameters. The edited coded video signal is transmitted by an I/F 15 to the monitoring terminal 17 via the LAN 16. The coded video signal received by an I/F 18 of the monitoring terminal 17 is buffered in a buffer 19 for timing control, decoded by an expansion section 20, converted by a DAC (Digital-to-Analog Converter) 21 to a video signal of a known standard (NTSC, RGB, etc.), and the video signal is inputted to the monitor 22, by which the user can view the monitor video images displayed on the monitor 22.

Next, the composition and operation of the stream processing section 14 will be described with reference to FIGS. 3, 4 and 5.

Figure 3:
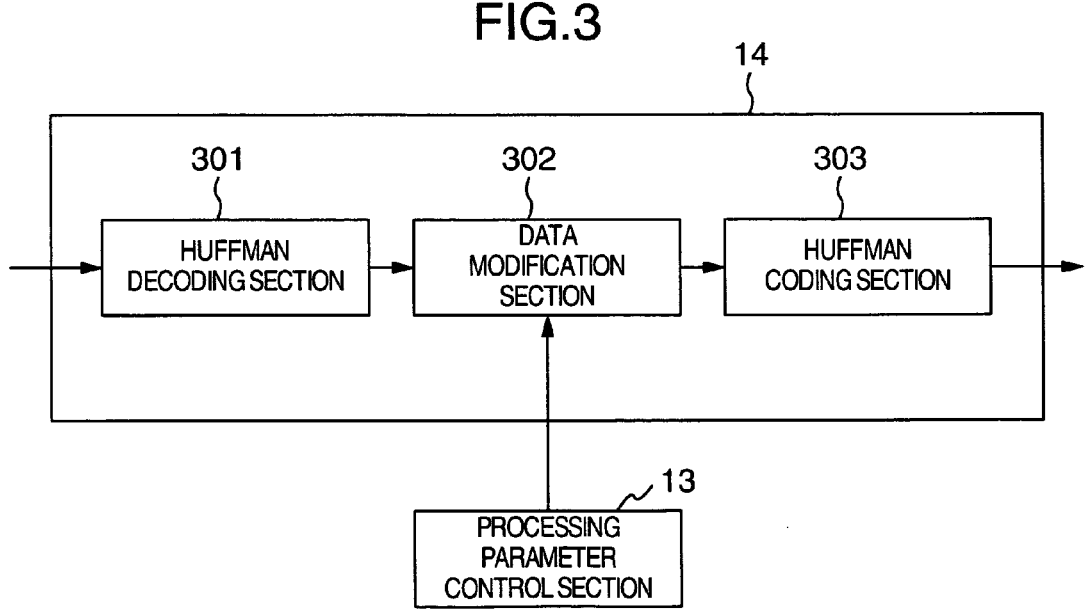
FIG. 3 is a block diagram showing a concrete example of the composition of a stream processing section of the security camera system of FIG. 1.

FIG. 3 is a block diagram showing a concrete example of the composition of the stream processing section 14. The stream processing section 14 of FIG. 3 includes: a Huffman decoding section 301 for decoding and converting the coded video signal (which has been encoded by variable length coding by MPEG, JPEG, etc.) to quantized DCT coefficients; a data modification section 302 for processing and editing the quantized DCT coefficients; and a Huffman coding section 303 for encoding the edited quantized DCT coefficients again. The stream processing section 14 operates as follows.

Figure 4:
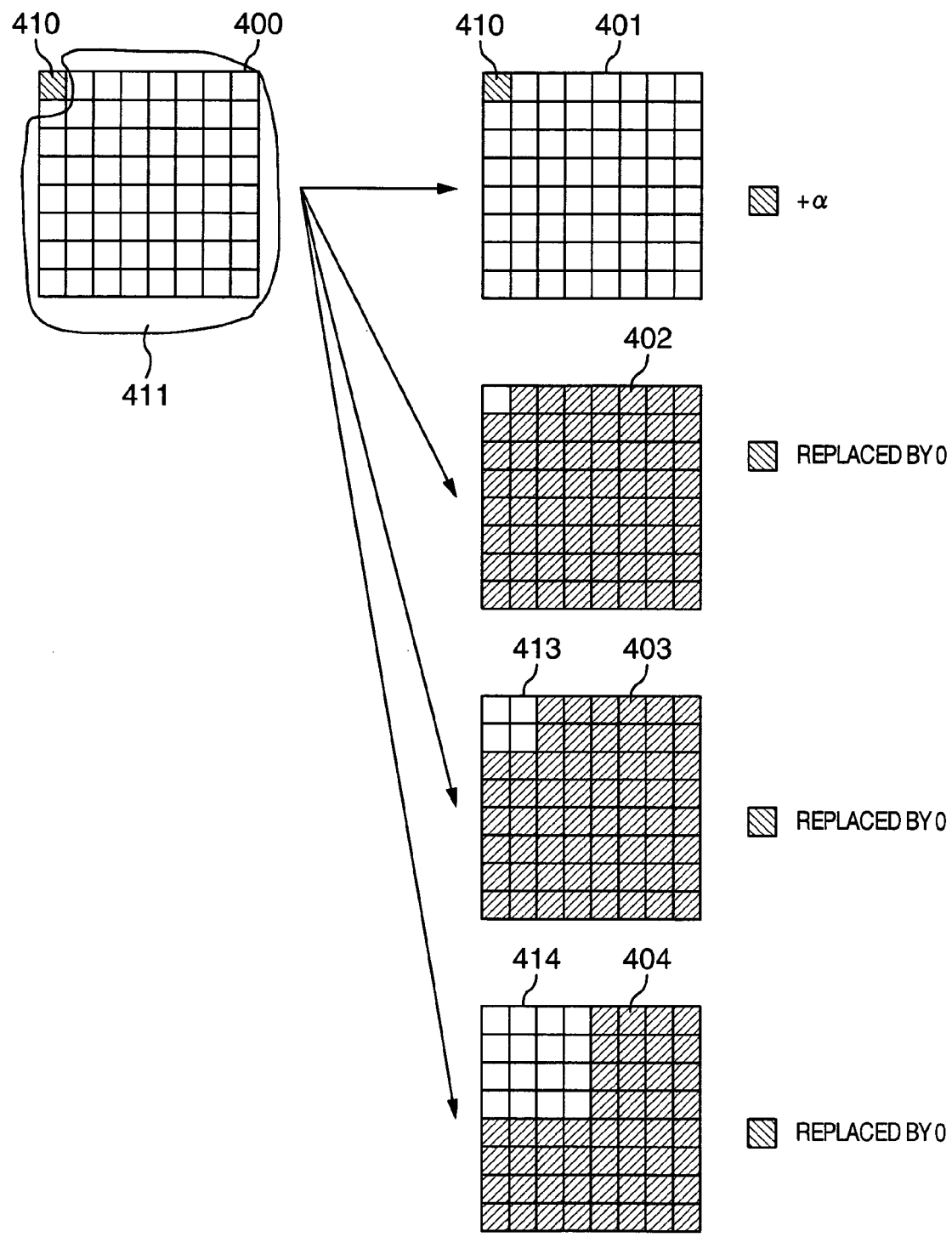
FIG. 4 is a schematic diagram showing a concrete method of stream processing employed in the first embodiment.

The coded video signal supplied from the buffer 7 is decoded by the Huffman decoding section 301 by means of Huffman decoding and thereby converted into an 8*8 set of quantized DCT coefficients 400 which are shown in FIG. 4.

The DCT coefficients 400 are composed of a DC (Direct Current) component and sixty-three AC (Alternating Current) components 411. In this embodiment, the DCT coefficients can be processed on the following four levels (level 1-level 4) under the control of the processing parameter control section 13.

Quantized DCT coefficients that are processed on the level 1 are shown with a reference numeral "401" in FIG. 4. The level 1, which processes the DC component 410 only, adds a constant $\alpha$ to the DC component 410. By the process, the average signal level of the DCT block is raised, and in an image obtained by re-encoding and decoding the signal, the high signal level can make it difficult to recognize what is seen in the image.

Figure 5:
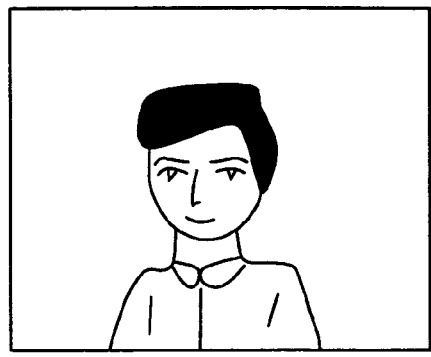
FIG. 5 is a schematic diagram showing examples of monitor video images after the stream processing of the first embodiment.
Figure 5:
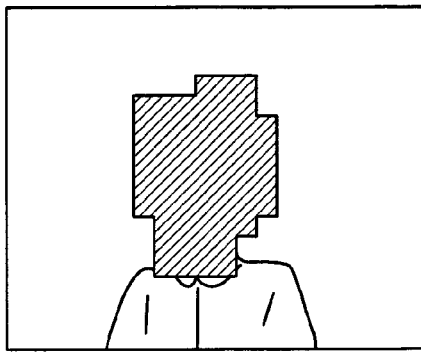
Figure 5:
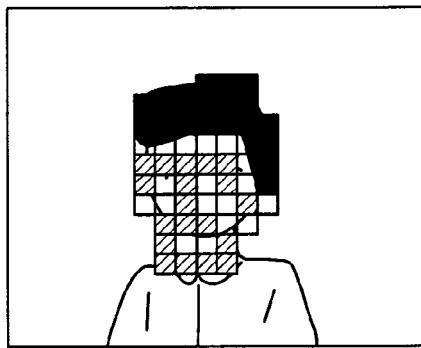
Figure 5:
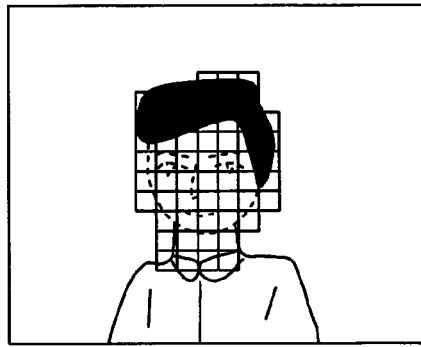
Figure 5:
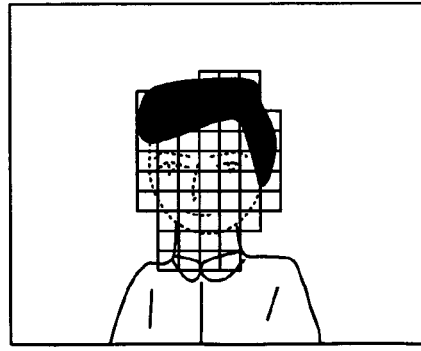

FIG. 5 shows examples of the playback of the monitor video images. Blocks including the face of the object is extracted from the original image 501 by the image recognition section 11, and the constant $\alpha$ is added to the DC components of the quantized DCT coefficients corresponding to the extracted blocks, by which an image 502, in which the face is unrecognizable, is outputted as the monitor video image.

Next, quantized DCT coefficients that are processed on the level 2 are shown with a reference numeral "402" in FIG. 4. The level 2 sets all the AC coefficients to 0, without changing the DC component 410. By the process, the AC components of the block are eliminated, and in an image obtained by re-encoding and decoding the signal, the whole block is represented by the DC component (the average of the 8*8 pixels), by which a mosaic-like image 503 as shown in FIG. 5 is outputted as the monitor video image.

Next, quantized DCT coefficients that are processed on the level 3 are shown with a reference numeral "403" in FIG. 4. The level 3 sets almost all the AC coefficients, except the top 2*2 area 413 including the DC component, to 0. By the process, only low-frequency AC components are left untouched, by which some features of the face become recognizable in an image 504 obtained by re-encoding and decoding the signal.

Next, quantized DCT coefficients that are processed on the level 4 are shown with a reference numeral "404" in FIG. 4. The level 4 sets almost all the AC coefficients, except the top 4*4 area 414 including the DC component, to 0. By the process, more AC components are left untouched compared to the step 3, by which more features of the face become recognizable in an image 505 obtained by re-encoding and decoding the signal, in comparison with the level 3.

Incidentally, methods that can be employed for processing the quantized DCT coefficients are not limited to the above ones. For example, it is also possible to restrict the effective area of the AC components in order of zigzag scan.

In the following, a second embodiment in accordance with the present invention will be described with reference to FIGS. 1, 6 and 7.

Figure 6:
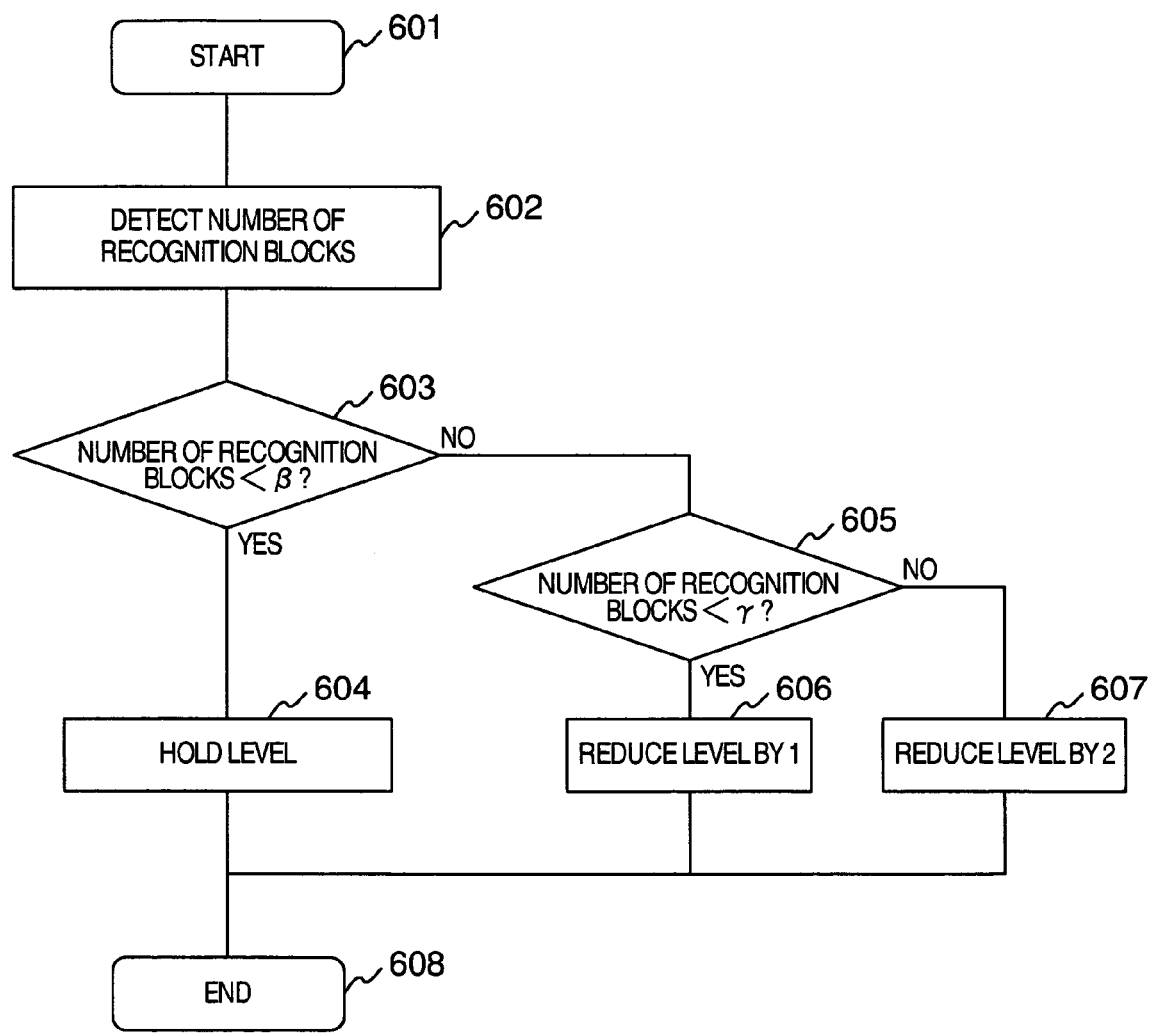
FIG. 6 is a flow chart showing an example of a process for determining a processing level in accordance with a second embodiment of the present invention.
Figure 7:
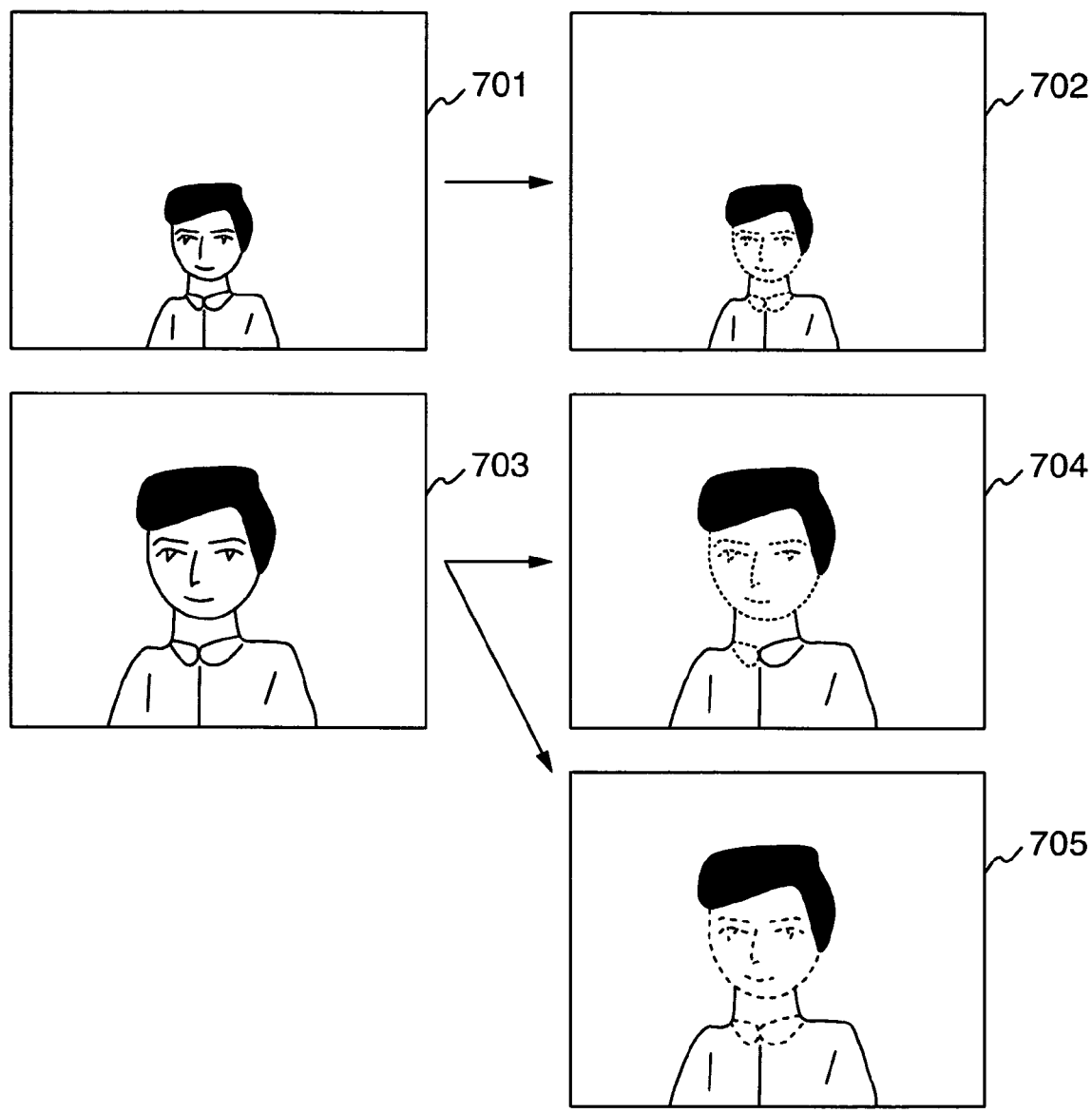
FIG. 7 is a schematic diagram showing examples of monitor video images after stream processing of the second embodiment.

FIG. 6 is a flow chart showing an example of the operation of the processing parameter control section 13 for determining the processing level in accordance with the second embodiment of the present invention, and FIG. 7 is a schematic diagram showing examples of monitor video images that are obtained by decoding a coded video signal that has been processed on a processing level determined by the flow of FIG. 6.

At the START (601), a proper processing level corresponding to the user's authority has already been inputted to the processing parameter control section 13 by the level control section 12. The image recognition section 11 has already detected and recognized the object of shooting (the face of a person in this example) as the target of processing and outputted information concerning the positions of DCT blocks and the number of the recognition blocks to the processing parameter control section 13. First, the number of the recognition blocks is detected (602) and the number is compared with a threshold value β (603). If the number is smaller than the threshold β, that is, if the object is small enough (YES in the step 603), the processing level is held intact (604). If the number is larger than or equal to the threshold β (NO in the step 603), the number is further compared with another threshold γ that is larger than β (605). If the number is smaller than the threshold γ (YES in the step 605), the processing level is reduced by 1 (606). The processing level is reduced by 2 (607) if the number is larger than or equal to the threshold γ (NO in the step 605). At the END (608), the processing parameter control section 13 determines the processing parameters based on the processing level which has been held or altered as above.

FIG. 7 is a schematic diagram shows examples of monitor video images that are obtained by adjusting the processing level depending on the size of the object as above.

Monitor video images 702 and 704 are those obtained by processing the original images 701 and 703 by the level 4. Even if the level 4 has been set to reveal the features of the object only roughly, the definition of the image becomes higher than expected when the object is large in the frame. In such cases, if the number of the recognition blocks is between β and γ in the flow chart of FIG. 6, the processing level is reduced by 1 and a monitor video image 705 that is obtained by the level 3 processing is outputted, instead of the monitor video image 704 obtained by the level 4 processing.

By the addition of the processing level adjustment depending on the size of the object, monitor video images having definition suitable for the authority of the user can be outputted properly and securely.

While the processing level was reduced in the above example, reverse level adjustment (raising the processing level when the object is small) is also possible.

Incidentally, the controller 5 has been described as a special-purpose apparatus in the above explanation, it can also be implemented by a computer (especially, by a server). In such cases, a program for implementing the above functions is installed in the computer, and the CPU (Central Processing Unit) of the computer carries out the above information processing according to the program to realize the present invention. The storage medium 9 can be implemented by various storage media, such as an HDD (Hard Disk Drive). The LAN 16 shown in FIG. 1 can also be replaced by a network other than LAN as long as it connects the controller 5 and the monitoring terminal 17. For example, the Internet can also be used as the network.

As set forth hereinabove, in the security camera system in accordance with the present invention, the processing of the original image can be conducted on various levels depending on the authority of the user (observer) both for real time monitor video images and recorded monitor video images of the past, by which monitoring ensuring the privacy protection can be realized. Further, the image processing of the present invention is also capable of realizing proper definition of the image of the object even if the size of the object in the frame changed, by which the reliability and stability of the privacy protection can be enhanced.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications fall within the ambit of the appended claims.

What is claimed is:

1. A security camera system comprising:
   an image pickup module which picks up an image, generates a video signal, and outputs the video signal;
   a record module which records the video signal on a record medium;
   an image recognition module which detects a specific image from the video signal outputted by the image pickup module or the video signal read out from the record module;
   a user recognition module which recognizes a plurality of different users and identifies a user who is watching an image generated from the video signal and outputs user information concerning said user who is watching said image, wherein said user can change depending on a situation;
   a processing module which receives the video signal outputted by the image pickup module or the video signal read out from the record module, and processes a part of the received video signal corresponding to the image detected by the image recognition module according to the user information, and outputs the processed video signal;

a display module which displays an image generated by the processed video signal outputted by the processing module; and a level control module which receives the user information, generates processing level information indicating level of the processing corresponding to the user information, and outputs the processing level information wherein the processing module carries out the processing so that a level of the image processing is changed between several different levels, for privacy protection, depending on the processing level information.

2. The security camera system according to claim 1, wherein the processing module changes level of the processing depending on size of the image detected by the image recognition module.

3. A monitoring system comprising:

one or more monitoring cameras each of which picks up an image, generates a digital video signal, encodes and compresses the digital video signal, and outputs the coded video signal;

a first network which communicates the coded video signals outputted by the monitoring cameras;

a controller including: a buffer which stores the coded video signal received via the first network; a media control module which reads the coded video signal from the buffer and writes the signal to a storage medium, while reading the coded video signal from the storage medium and writing the signal to the buffer; and an I/F module which directly outputs the received coded video signal stored in the buffer or outputs the coded video signal written and read out from the storage medium to a second network; and a monitoring terminal module which receives the coded video signal via the second network, decodes and decompresses the coded video signal, and plays back the video signal, wherein:

the controller is provided with: an image recognition module which detects an image of an object such as a person from the coded video signal; and a stream processing module which processes the image detected by the image recognition module on the coded video signal, and the monitoring terminal module is provided with a user recognition module which recognizes a user who uses the monitoring terminal module, and authority of the user is confirmed by the user recognition module and the user authority is informed to the controller via the second network, and the processing of the coded video signal is carried out depending on the user authority.

4. The monitoring system according to claim 3, wherein:
the user recognition module has a function of setting and recognizing a plurality of user authority levels, and the stream processing module switches the way of processing depending on the user authority level.

5. The monitoring system according to claim 3, wherein:
MPEG or JPEG is employed as algorithm for encoding the digital video signal, and quantized DCT (Discrete Cosine Transform) coefficients are processed in the processing of the coded video signal.

6. The monitoring system according to claim 3, wherein:
the user authority recognized by the user recognition module is adjusted depending on size of the object detected by the image recognition module, and the processing of the coded video signal is carried out depending on the adjusted user authority.

7. A controller comprising:

a first input module to which a video signal generated and outputted by an image pickup module is inputted;

a record module which records the inputted video signal on a record medium;

an image recognition module which detects a specific image from the inputted video signal or the video signal read out from the record module;

a user recognition module which recognizes a plurality of different users and identifies a user who is watching an image generated from the video signal, and outputs user information concerning said user who is watching said image, wherein said user can change depending on a situation;

a second input module which receives user information outputted by said user recognition module;

a processing module which receives the inputted video signal or the video signal read out from the record module, processes part of the video signal corresponding to the image detected by the image recognition module in a way varying depending on the user information;

an output module which outputs video information processed by the processing module; and a level control module which receives the user information, generates processing level information indicating level of the processing corresponding to the user information, and outputs the processing level information wherein the processing module carries out the processing so that a level of the image processing is changed between several different levels, for privacy protection, depending on the processing level information.

8. A monitoring terminal for a security camera system including a monitoring terminal; a camera module which outputs a video signal; and a controller which processes the video signal and outputs the processed video signal, the monitoring terminal receiving the processed video signal outputted by the controller and displaying an image on a monitor by the processed video signal, wherein the monitoring terminal comprises:

a user recognition module which recognizes a plurality of different users and identifies a user who is watching the image displayed on the monitor, and outputs user information concerning said user who is watching said image, wherein said user can change depending on a situation;

a transmission module which transmits the user information to the controller;

a reception module which receives the processed video signal output from the controller which processes a specific part of the video signal outputted by the camera module so that a level of that image processing is changed between several different levels, for privacy protection, depending on the user information transmitted from the transmission module; and an output module which outputs the received processed video signal to the monitor.

* * * * *